United States Patent [19]

Campbell

[11] Patent Number: 4,475,750

[45] Date of Patent: Oct. 9, 1984

[54] PIPE STRESS/STRAIN NEUTRALIZER WITH HYDRAULICALLY BALANCED SPHERICAL ELEMENT

[76] Inventor: Joseph K. Campbell, 215-52nd St., Delta, Canada, V4M 2Y3

[21] Appl. No.: 439,349

[22] Filed: Nov. 5, 1982

Related U.S. Application Data

[63] Continuation-in-part of Ser. No. 345,063, Feb. 2, 1982, which is a continuation-in-part of Ser. No. 6,439, Jan. 25, 1979, Pat. No. 4,317,586.

[51] Int. Cl.³ ............................................. F16L 27/00
[52] U.S. Cl. ...................................... 285/95; 285/165; 285/370; 285/DIG. 1
[58] Field of Search .................... 285/95, DIG. 1, 165, 285/166, 228, 370

[56] References Cited

U.S. PATENT DOCUMENTS

| | | | |
|---|---|---|---|
| 2,545,701 | 3/1951 | McCausland | 285/228 |
| 3,404,904 | 10/1968 | Roe | 285/165 |
| 3,427,051 | 2/1969 | White et al. | 285/95 X |
| 3,889,985 | 6/1975 | Gartmann | 285/95 |
| 3,938,833 | 2/1976 | Miyaoka | 285/166 |
| 3,961,815 | 6/1976 | Coulboy et al. | 285/DIG. 1 X |
| 4,317,586 | 3/1982 | Campbell | 285/165 X |

FOREIGN PATENT DOCUMENTS

| | | | |
|---|---|---|---|
| 1156882 | 7/1969 | United Kingdom | 285/165 |
| 2066399 | 7/1981 | United Kingdom | 285/166 |

*Primary Examiner*—Thomas F. Callaghan
*Attorney, Agent, or Firm*—Sim & McBurney

[57] ABSTRACT

There is provided a spherical bearing arrangement within a pipe joint between a first pipe end and a second pipe end. The pipe joint is telescoping to allow the pipe ends to move axially, rotatably and genicularly with respect to each other, and includes the plurality of contraction units located radially outwardly of the pipe ends. The contraction units are connected between the pipe ends and are supplied with fluid under pressure so that they counteract the axial separation tendency between the pipe ends when the latter are filled with a fluid under pressure. The joint includes a hollow cylinder extending between the pipe ends, and the spherical bearing is in a form of a ring member snugly but slidably surrounding each end of the hollow cylinder and mounted thereon in a liquid-tight manner. Each ring member has a male spherical surface with its center of curvature located on the axis of the cylinder, and mating with female spherical seat means on the respective pipe end. The fluid within the pipe ends has direct access to part of each ring member adjacent its respective pipe end and thus exerts a first axial force on the ring member in the direction away from the respective pipe end. Further fluid conduit means are provided from the interior of one of the pipe ends to a part of each ring member remote from its respective pipe end, and thus exerting a second axial force on the ring member in the direction toward the respective pipe end. The axial projections of the areas of the parts of the ring member subjected to these forces are such as to make the first and second axial forces substantially identical, so that the ring member is in hydraulic balance.

5 Claims, 3 Drawing Figures

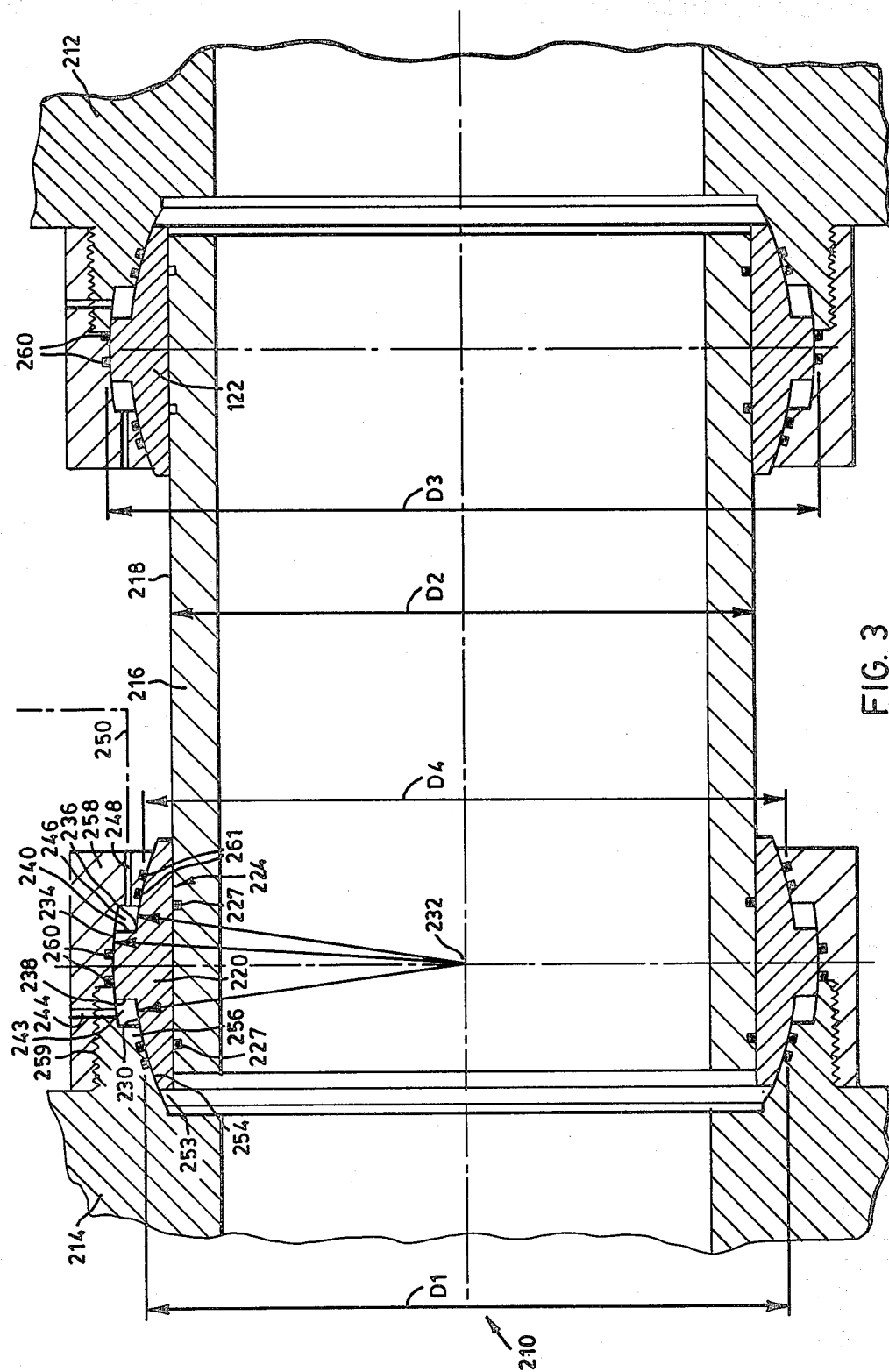

PIPE STRESS/STRAIN NEUTRALIZER WITH HYDRAULICALLY BALANCED SPHERICAL ELEMENT

This application is a continuation-in-part of U.S. patent application Ser. No. 345,063, filed on Feb. 2, 1982, which itself is a continuation-in-part of U.S. patent application Ser. No. 6,439, filed on Jan. 25, 1979 now U.S. Pat. No. 4,317,586.

This invention relates generally to an apparatus for equalizing internal pressure thrusts on pipes or conduits which utilize expansion joints. More particularly, this invention is directed to apparatus for opposing or counteracting internal pressure thrusts on conduits having expansion joints, whereby the internal fluid pressure of the medium within the conduit or pipe actuates other expansible and pressure-operated thrust-producing means which in turn are linked to parts of the conduit on either side of the expansion joint, in order to provide a counteracting force.

GENERAL BACKGROUND OF THIS INVENTION

Many conduit installations are subjected to sizeable temperature and pressure variations, and for this reason it is frequently necessary to provide pipes, ducts and the like with one or more expansion joints to accommodate the pipe growth, shrinkage or displacement.

One approach to solving the problem of providing compensation for separative thrust at expansion joints is exemplified in my own earlier U.S. Pat. No. 4,018,463, issued Apr. 19, 1977. In that patent, the compensating portions are all encased in a large outside cylindrical portion having a maximum diameter appreciably larger than the pipe diameters which the coupling is intended to join. Large annular members are also provided within the cylindrical portion. Articulating connections are attached to the annular members within the space enclosed by the cylindrical portion, and cannot be accessed for repair or replacement without first entirely disassembling the pipe joint by removal of the cylindrical member.

In my U.S. patent application Ser. No. 6,439, a different approach to thrust compensation for expansion pipe joint couplings is taken. In that application, the compensating members are located entirely outside of the expansion pipe joint. This greatly simplifies the construction, and renders much simpler the task of repair or replacement of various components of the joint. Prior art pertinent generally to this particular approach includes U.S. Pat. No. 2,545,701, McCausland, issued Mar. 20, 1951, and U.S. Pat. No. 3,458,219, Wesch, issued July 29, 1969.

In McCausland, there is provided a bellows-like expansion joint, together with a plurality of exteriorly mounted thrust compensating devices, one of which includes a cylinder connected to one pipe end and a piston within the cylinder connected to the other pipe end. The volume within the cylinder on one side of the piston is adapted to be pressurized with the fluid contained in the pipes themselves, and this pressure seeks to cause relative movement between the piston and the cylinder which would compensate for the separative thrust on the expansion joint.

In the Wesch patent, the compensation is brought about by way of tension coiled springs connected between flanges attached to the pipe ends, and a telescoping cylindrical member is provided between the pipe ends to allow the expansion itself to take place.

My earlier U.S. patent application Ser. No. 6,439 had as one of its aims to provide a thrust-compensating expansion joint for pipe ends, in which articulation of one pipe end with respect to the other, as well as axial displacement of the one with respect to the other, is permitted over a relatively large range.

A further aim of that application was to provide a cylinder/piston thrust-compensating assembly for an expansion pipe joint, in which the cylinder was not subjected to axial stress, as occurs in the prior art.

In my subsequent continuation-in-part U.S. patent application Ser. No. 345,063, a principal aim was to provide a cylinder/piston thrust-compensating assembly for an expansion pipe joint, in which the cylinder is not located radially adjacent the expansion assembly, so that removal thereof to gain access to the expansion assembly itself is facilitated.

In two of the embodiments in continuation-in-part U.S. patent application Ser. No. 345,063, the expansion joint included, between the two pipe ends, a hollow cylinder with a cylindrical outer surface, two ring members having an inner cylindrical surface for engagement with one end of the outside surface of the hollow cylinder, and having male spherical surface means on the outside, for engagement with female spherical surfaces provided on or firmly attached to the respective pipe end.

In the designs of the two embodiments just mentioned, there was provision for maintaining the ring members in hydraulic balance, so that no axial force was applied against the ring members. This minimizes wear of the seating surfaces and reduces the risk of binding. The present invention encompasses these two embodiments, and adds a third, in which the structure is markedly simpler than the first two.

GENERAL DESCRIPTION OF THIS INVENTION

Accordingly, it is an aspect of the present invention to provide an expansion pipe joint having a hollow cylinder located between two pipe ends, with ring members in slidable, sealed engagement with the ends of the outside surface of the hollow cylinder, the ring members providing spherical bearing means coacting with the pipe ends, in which the ring members themselves are in hydraulic balance.

More particularly, this invention provides a pipe joint between a first pipe end and a second pipe end, comprising telescoping means which includes a hollow cylinder having spherical bearing means at either end. A plurality of contraction units is located exteriorly of the pipe ends and the telescoping means, each contraction unit including a cylinder and a piston in the cylinder, the cylinder being connected to the first pipe end and the piston being connected to the second pipe end. The cylinder defines a closed volume on the side of the piston which is closest to the second pipe end. Fluid conduit means is provided from the interior of one of the pipe ends to the closed volume just defined, so that the pressure in the closed volume is a function of the pressure inside the pipes. Each spherical bearing means includes a ring member snugly but slidably surrounding its respective end of the cylinder and mounted thereon in a liquid-tight manner. The ring member has male spherical surface means with its centre of curvature located on the axis of the cylinder, and mating with female spherical seat means on the respective pipe end. The fluid within the pipe ends has direct access to part of the ring member adjacent its respective pipe end and thus exerts a first axial force on the ring member in the direction away from the respective pipe end. Further fluid conduit means are provided from the interior of one of the pipe ends to a part of the ring member remote from its respective pipe end and thus exerting a second axial force on the ring member in the direction toward the respective pipe end. The axial projections of the areas of the parts of the ring member are such as to make the first and second axial forces substantially identical, so that the ring member is in hydraulic balance.

GENERAL DESCRIPTION OF THE DRAWINGS

Three embodiments of this invention are illustrated in the accompanying drawings, in which:

FIG. 3 is a partial axial sectional view of a pipe joint, illustrating a third embodiment of this invention.

DETAILED DESCRIPTION OF THE DRAWINGS

Figure 1:
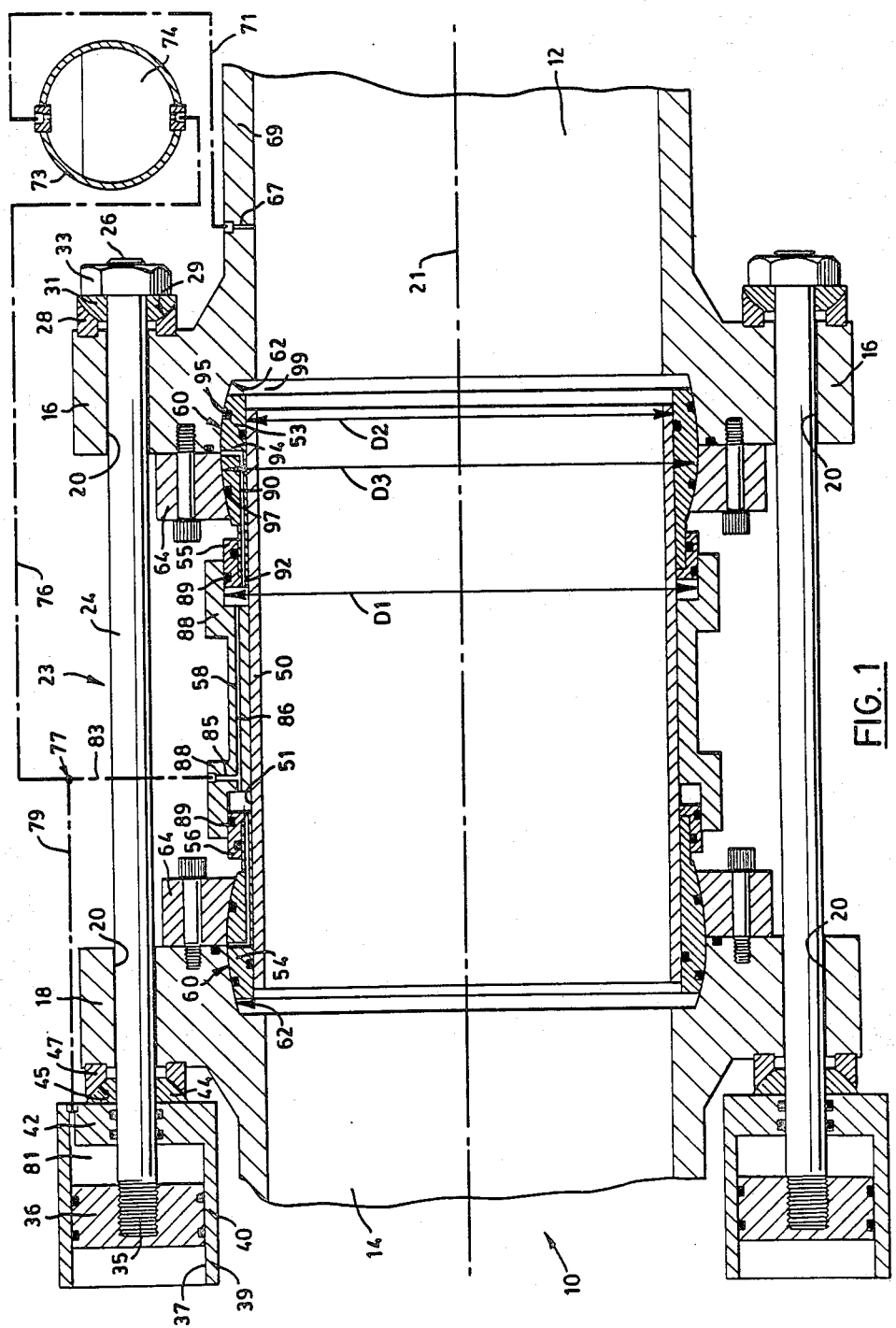
FIG. 1 is an axial sectional view of a pipe joint, illustrating one embodiment of this invention.

Attention is first directed to FIG. 1, in which a pipe joint shown generally by the numeral 10 is seen to include a first pipe end 12 and a second pipe end 14. It is to be understood that the pipe ends 12 and 14 may represent literally the ends of two adjacent sections of pipe which are to be joined together by a pressure-compensated telescoping joint, or alternatively may represent attachment members intended to be secured to the actual pipe sections. It will be appreciated from what follows that this distinction has no bearing on the present invention, which functions independently of whether the portions 12 and 14 are the actual pipe ends or attachments thereto.

The first pipe end 12 is integral with a first flange member 16, while the second pipe end 14 is integral with a second flange member 18. The two flanges 16 and 18 are each provided with a plurality of axial bores 20, of which two for each flange are visible in the sectional view of FIG. 1. The bores 20 are equally spaced from the axis 21 of the pipe joint, and are also uniformaly spaced circumferentially around the respective flange members 16 and 18. The piston/cylinder arrangement which permits compensation of the axial separative thrust between the two pipe ends 12 and 14 will now be described with respect to the upper such combination seen in FIG. 1, it being understood that the same description would apply to that shown at the bottom in FIG. 1. The numerals for the various parts have been applied only to the the upper part of FIG. 1, in order to avoid cluttering the Figure.

Shown at the top in FIG. 1 is a contraction unit generally designated by the numeral 23, the contraction unit including a rod member 24 having one end 26 engaged with the first flange member 16 through the intermediary of an annular member 28 surrounding the bore 20 on the rightward side of the first flange member 16 (i.e. the side way from the second pipe end 14), defining a female spherical seat 29 in which a male spherical bearing member 31 is seated. The end 26 of the rod member 24 is threaded at its extremity and has threaded thereon a nut 33 which is forced against the bearing member 31 by tension in the rod member 24.

The other end 35 of the rod member 24 has its extremity threaded, and is threadably engaged with a piston 36 sliding in a cylindrical bore 37 of a cylinder 39 which includes side walls 40 and a bottom wall 42, the bottom wall 42 lying between the piston 36 and the second flange member 18. The bottom wall bears directly against a bearing member 44 identical to the bearing member 31, and seated in a female spherical bearing seat 45 defined by an annular member 47 identical to the member 28. The annular member 47 is concentric with the respective bore 20 in the second flange member 18. Due to the construction just described, when the pipe ends 12 and 14 are aligned, the rod member 24 extends axially of the two bores 20 in the flange member 16 and 18. It is to be noted in particular that the bores 20 have a larger inside diameter than the outside diameter of the rod member 24. This, along with the spherical seating defined between the members 28 and 47 on the one hand and the member 31 and 34 on the other, allows the pipe ends 12 and 14 to undergo a limited degree of flexure or bending, in which one pipe end pivots in a plane containing the axes of both pipe ends. It also permits a limited degree of swivelling of one pipe end 12 with respect to the other.

Turning now to the actual joint itself, a structure will be described which permits the pipe ends 12 and 14 to move axially away and towards each other, to swivel to a limited degree about their common axis with respect to each other, and to undergo flexure or pivotal movement in a plane containing both axes.

There is provided a cylindrical member 50 having a smooth, cylindrical outer surface 51 upon which rides a first ring member 53, a second ring member 54, a first L shaped member 55, a second L shaped member 56, and a bridge member 58.

It will be seen that each of the ring members 53 and 54 defines an outwardly facing male spherical surface 60 which seats against a female spherical bearing surface defined in part by a recess 62 in the respective pipe end, and in part by a ring portion 64 in the shape of an annulus adapted to be securely bolted to the face of the respective flange member 16 and 18.

As can be seen in FIG. 1, all of the mating sliding surfaces between the various members just described are provided with suitable seals of a conventional nature, which need not be described in detail with the exception of certain ones which play a role in pressure balancing and equalization for the various components 53, 54, 55, 56 and 58.

Before describing this balancing arrangement, attention is directed to the right in FIG. 1 where an access port 67 is shown through the wall 69 of the first pipe end 12. A broken line 71 represents a pressure conduit extending from the access port 67 to an accumulator 73. It is to be understood that the accumulator 73 would be used only in the case where the pipe contained a gaseous material, the function of the accumulator being to transfer the pressure of the gaseous material to a hydraulic fluid 74, which then is used to act upon the various components involved in the telescoping arrangement, and also to operate the piston/cylinder arrangement described earlier. It will be seen that the conduit 71 enters the accumulator 73 at the top, and that a further conduit 76 exits from the accummulator 73 at the bottom thereof, and branches at 77 to provide one line 79 connecting through the bottom wall of the cylinder 39 to supply pressurized hydraulic fluid to a chamber 81 defined between the piston 36 and the bottom wall 42. A second line 83 extends from the junction 77 downwardly to the bridge member 58, where it enters a passageway 85 which in turn communicates out either end of the bridge member 58 along a passageway 86. The passageway 86 opens into a small variable space between the bridge member 58 and the respective L-shaped members 55 and 56. In particular, it will be noted that the bridge member 58 defines two flanges 88, each having an internal cylindrical surface adapted to bear slidingly against the outer surface of the respective L-shaped member 55 and 56. Seals 89 are provided at this mating surface, to prevent loss of fluid from the chambers just mentioned. In FIG. 1, the diameter of the inside cylindrical seat defined by flanges 88 is identified as D1 whereas the outside diameter of the cylindrical member 50 is identified as D2. It will be seen that the annular chamber defined between the bridge member 58 and each of the L-shaped members 55, 56 has the outside diameter D1 and the inside diameter D2. Thus, the force seeking to separate the bridge member 58 from each of the L-shaped members 55, 56 will be the product of the pressure in the respective chamber defined between them, multiplied by the area between the diameters D1 and D2. Due to symmetry, the bridge member 58 will be in balance. With reference to ring member 53 it will be seen that a passageway 90 therein communicates with a short passageway 92 and an L-shaped member 55, and further communicates with a radial passageway 94 which opens through the topmost point of the spherical curvature 60, and also opens at the interface between the cylindrical member 50 and the ring member 53. Two seals 95 and 97 are located at equal radii from the axis 21, and therefore there is a balance of forces arising at the spherical mating surfaces in the region lying between the seals 95 and 97. However, a further force arises, due to the gap 99 between the ring member 53 and the pipe end 12, which gap communicates with the center of the pipe end 12, and therefore is subject to the pressure of the contents thereof. The diameter D3 represents the effective acting distance of the seals 95 and 97, and therefore also represents the outer limit of the area over which the pressure in the gap 99 will act. The inner limit is D2, since the cylindrical member 50 is in balance, due to the fact that the same pressure is exerted at both of its ends. In the embodiment of FIG. 1, D1 is equal to D3, and therefore the pressure arising in the chamber defined between the bridge member 58 and the L-shaped member 55 exactly counter-balances the pressure arising from the gas present in the gap 99. The same balance takes place at the other end of the cylindrical member 50, but does not need to be described in detail.

It is to be noted in particular that the cylinder 39 lies "outboard", i.e. axially displaced away from, the portions just described which allow for telescoping and flexing of the joint between the two pipe ends 10 and 12. The effect of displacing the cylinder 39 and the piston 36 axially away from the active portions between the pipe ends 12 and 14 is to allow a more compact structure, and particularly to allow access to the parts numbers 53, 54, 55, 56 and 58 merely by unscrewing the bolts 33. Once this has been done, the rod member 24 need merely be slid out leftwardly from the bores 20 and the flange member 16 and 18, thus removing any obstacle to disassembly and repair of the basic telescoping and flexing joint.

Figure 2:
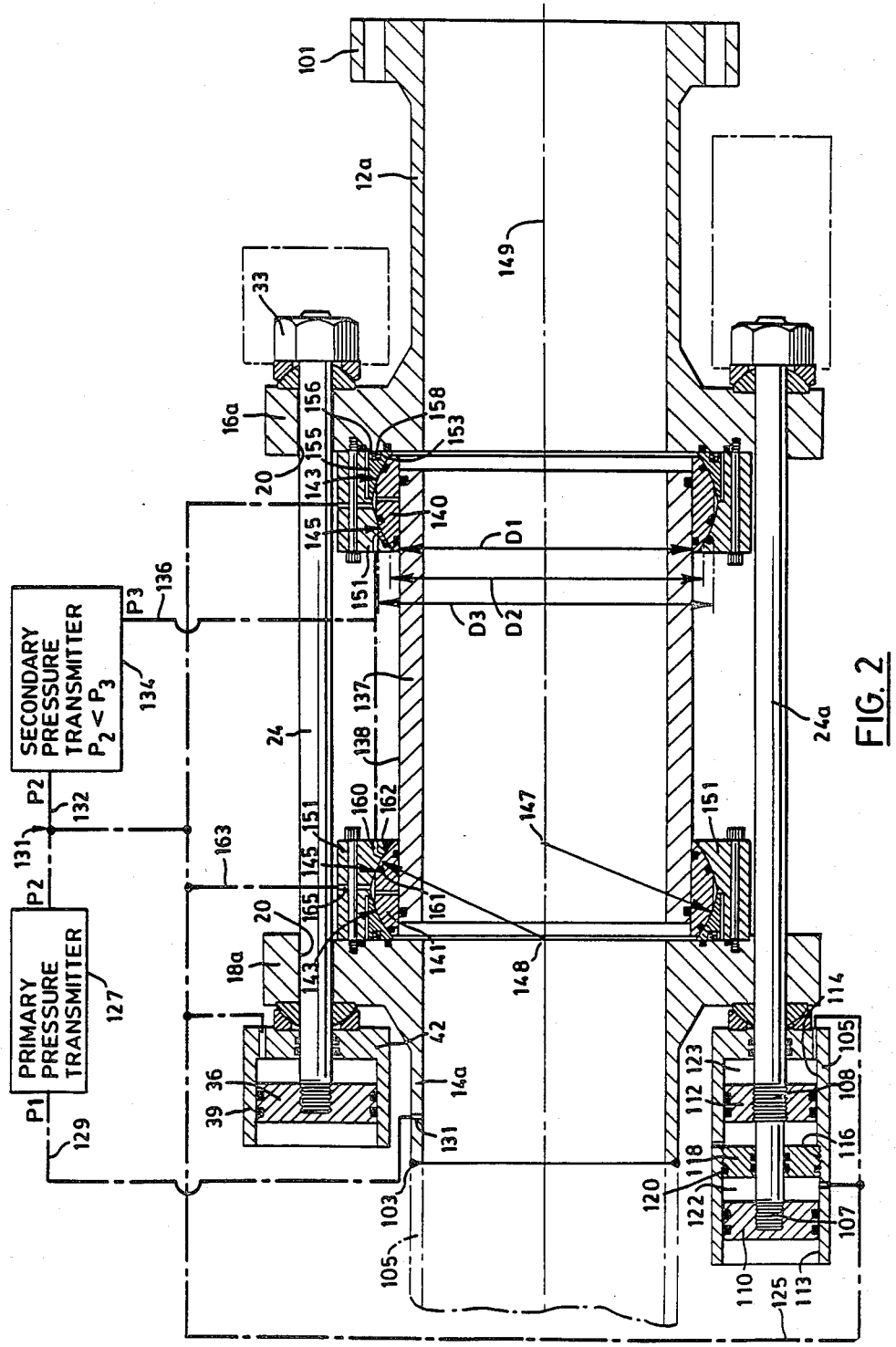
FIG. 2 is an axial sectional view of a pipe joint, illustrating a second embodiment of this invention.

Attention is now directed to FIG. 2, which shows the second embodiment of the invention. In FIG. 2, the pipe end 12a is shown as a sleeve member which is adapted by way of a flange 101 to be bolted securely and in sealed relationship with an actual pipe end. To the left in FIG. 2, the pipe end 14a is welded at 103 to an actual pipe section 105 drawn in broken lines. These represent two possible ways of connecting flange members 16a and 18a to respective pipe sections.

Looking at the top portion of FIG. 2, the rod member 24 is identical to rod member 24 in FIG. 1, as are the other portions of that assembly, including the cylinder 39, and the piston 36. In FIG. 2, the male and female bearing seats between the parts numbers 31, 28 and 44, 47 are reversed, but it will be understood that such reversal has no effect on the basic function of spherical seats. Again bores 20 are provided and are larger in diameter than outside diameter of the rod member 24.

At the bottom in FIG. 2, a variation of the cylinder is illustrated. At bottom left, a cylinder 105 is elongated, and a rod member 24a, while having at its rightward end the same construction and attachment system as is shown at the top of FIG. 2, has at its leftward end two threaded regions 107 and 108, each of which engages a respective piston 110 and 112. The pistons 110 and 112 slide in respective cylindrical bores 113 and 114, the bore 113 having a slightly larger diameter than the bore 114 by reason of the provision of an internal thread 116 adapted to be engaged by an intermediate wall member 118 having external threads and a seal 120.

The cylinder and multiple piston arrangement shown at the bottom left in FIG. 2 has the construction disclosed and claimed in my earlier U.S. patent application Ser. No. 6,439, filed on Jan. 25, 1979, and therefore does not need to be described in greater detail. The basic effect of ganging the pistons 110 and 112 is to permit a smaller diameter cylinder for the same net force, since each piston contributes its own component to the force, just as if the other piston where not acting. The pressure chambers 122 and 123 associated with the pistons 110 and 112 respectively are fed from a conduit 125 which connects with the output from a primary pressure transmitter 127 having an input line 129 connected to an access port 131 through the wall of the pipe end 14a. The primary pressure transmitter 127 may be of the same construction and effect as the accumulator 73 shown in FIG. 1. More specifically, pressure P2 is the same as P1, but the fluid in the line 125 is a hydraulic liquid, whereas the fluid in the line 129 may be a gaseous material.

From a junction location 131, a further conduit 132 proceeds to a secondary pressure transmitter 134, of which the output in conduit 136 is greater than the input pressure P2. The fluid in the conduit 136 may also be pressurized hydraulic liquid, and its function at the higher pressure will be described after the description of the parts permitting telescoping and flexing action of the pipe ends 12a and 14a.

The structure includes a cylindrical member 137 having a cylindrical outer surface 138 which slidingly mates with the inside cylindrical bearing surfaces of two ring members 140 and 141. Each ring member 140, 141 defines two outer spherical male surfaces 143 and 145 of which the centers of curvature 147 and 148, respectively are spaced apart along the axis 149 of the cylindrical member 137, so that the axial section of each ring member 140, 141 (i.e. the section seen in FIG. 2) is that of an ogive. More specifically the ogive is known technically as a "dropped ogive" which is an ogive defined by two circular arcs which are such that the center of each arc lies within the other arc. This takes place so long as the distance separating the centers of curvature is less than the radius of the smallest arc. In the present case the two radii are the same, and it can be clearly seen in FIG. 2 that the distance separating the centers of curvature 147 and 148 is less than the radii.

Each pipe end 12a and 14a fixedly supports a ring portion 151 which defines an internal female spherical surface mating with the male surface 145 of the respective ring member 140 and 141. The ring portions 151, however, are recessed away from the surfaces 143, to define an annular gallery which is wedged-shaped in radial section, in which a floating annulus 153 is lodged. In particular, each floating annulus 153 has an outer diameter less than the inner diameter of the recess of the ring portion in which it is lodged. In section, each floating annulus 153 defines a female spherical seat mating with the respective surface 143 of the respective ring member 140, 141, has a substantially cylindrical outer surface 155, and has a substantially planar end face 156. The end face 156 is intended to bear against the respective flange member 16a, 18a, but is biased away from its respective flange member by a plurality of compression coil springs 158 which are distributed uniformly around the floating annulus 153. Because each floating annulus 153 is in a relatively "loose" compartment, and because it is biased towards its respective cylindrical male surface 143 by the springs 158, it will tend to remain seated against the surface 143 as the respective pipe end swivels with respect to the cylinder 137, provided the swivelling or flexure is of a limited extent, for example not more than that which would cause the outer surface 155 of floating annulus 153 to "bottom out" against the inner surface of the ring portion 151. This "bottoming out" feature will generally be provided to prevent excessive clearance occurring between the end face 156 of the floating annulus 153, and the adjacent sliding surface of flage members 16a, 18a. Under normal circumstances this swivelling capability is likely to be less than 10° at each end.

Referring now to the leftward ring member 151 in FIG. 2, it will be seen that the higher pressure P3 exiting from the secondary pressure transmitter 134 passes through a port 160 into the space between two dynamic seals 161 and 162. The seals 161 and 162 are at diameters D3 and D2 respectively from the axis 149. Hence, a force will act leftwardly against the ring member 141 which will be the product of the pressure P3 and the area defined between the diameters D2 and D3.

The pressure P2 is admitted along conduit 163 through port 165 to the region above the ring member 141 (which has a cylindrical facet at its peak), and since P1 is equal to P2, the force being exerted rightwardly on the ring member 141 will be equal to the product of P2 and the area represented between diameter D3 and diameter D1, the latter being the outside diameter of the cylindrical member 137. By correctly selecting the ratio between pressures P2 and P3, the ring members 140 and 141 can be brought into dynamic hydraulic balance.

In the appended claims, reference is made to a "ring member", and in connection with the first embodiment of this invention illustrated in FIG. 1, it is to be understood that the ring member may be taken to be the composite member including, for example, the ring member 54 and the L-shaped member 56. This composite member is in hydraulic balance, as above explained.

Attention is now directed to FIG. 3, which shows a second embodiment of a pipe joint 210, including a first pipe end 212 and a second pipe end 214. The view in FIG. 3 does not include complete flanges corresponding to flanges 16 and 18 in FIG. 1, nor does it include the force-compensating contraction units such as that illustrated generally at the numeral 23 in FIG. 1. Such illustration is not necessary, as this invention does not concentrate specifically on the contraction units, but rather on the hydraulic balance of the ring members.

Referring to FIG. 3, a hollow cylinder 216 is provided, corresponding to the cylindrical member 50 in FIG. 1. The hollow cylinder 216 has a cylindrical outer surface 218 which engages two ring members 220 and 222 at its ends. Each ring member 220, 222 has an internal cylindrical face 224 mating with the external cylindrical face 218. To effect a liquid-tight seal between these two faces, sealing means (for example O rings) 227 are provided.

Each of the ring members 220, 222 is shaped to define male spherical surface means which can be seen (looking at the ring member 220) to include a first male spherical surface 230 having a first diameter A and a centre of curvature 232, a second male spherical surface 234 having a second diameter B and the same centre of curvature 232, and a third male spherical surface 236 having a third diameter C and again the same centre of curvature. Generally speaking, the diameter B is larger than the diameter A and also larger than the diameter C. In the particular embodiment illustrated, diameters A and C are identical, but it is to be understood that the identity of these two diameters is not essential. A first step 238 is defined between the first and second surfaces 230 and 234, while a second step 240 is defined between the second and third surfaces 234 and 236. A first annular chamber 243 is defined adjacent the first step 238 and is vented to the atmosphere through a vent 244. A second annular chamber 246 is located adjacent the second step 240, and is in communication, through a passageway 248, with a conduit 250 (shown in broken lines) which connects the interior of one of the pipe ends to the passageway 248.

An axial force will be exerted on each ring member equivalent to $P \times A$, where A is the effective area (the axially projected area) of the annulus described within diameters D1 and D2, D2 being the outside diameter of the hollow cylinder 216, and D1 being the effective limit to the exertion of the intra-pipe pressure as it creeps up from the region 253 and along the interface between the member 220 and a female seat 254 defined on an axially projecting flange 256 which is integral with the pipe end 214. As can be seen in FIG. 3, the annular chamber 243 is defined between the ring member 220 and the flange 256.

The annular chamber 246 is defined between the ring member 220 and a collar 258 which is threaded at 259 on the flange 256, and which contains the passageway 248. The second male spherical surface 234 seats against a complementary female seat defined partly by the flange 256 and partly by the collar 258, as can be seen in FIG. 3. The latter female bearing seat also partly defines the annular chambers 243 and 246. D3 represents the outermost limit to which pressure in the annular chamber 246 is exerted against the ring member 220 in the axial direction. The outer limit of D3 is defined by seal means 260. The diameter D4, which is the effective diameter of seals 261, defines the inner limit of the axial force arising from the pressure in the annular chamber 246.

It will be appreciated that the ring member 220 undergoes an axial force in the leftward direction due to the hydraulic pressure in the annular chamber 246 introduced along the fluid conduit 250. The fluid conduit 250 may be directly and separately connected to the interior of one of the pipe ends 212, 214, if the pipes carry a liquid, or alternatively may be connected to the outlet from an accumulator such as that shown at 73 in FIG. 1, in the case of the pipes carrying a gaseous material under pressure. In either case, it would be convenient to have one take-off from the interior of the pipe ends, either through an accumulator or not, depending upon the material conveyed by the pipes, thence to a fork having one branch going to the contraction units and another branch going to the passageway 248 (there being another such passageway for the ring member 222). Where no pressure magnifier or reducer is inserted in that line, the pressure inside the chamber 246 will be the same as the pressure inside the pipe ends 212, 214, and in such a case, the design would be made such that the annular, axially projected area between diameters D1 and D2 is the same as that between diameters D3 and D4. This will produce dynamic hydraulic balance in the ring members 220 and 222.

The embodiment shown in FIG. 3 has a significant advantage over both of the other embodiments shown herein, in that a smaller number of parts is required. Moreover, by adequately sizing the chambers 243 and 246, a large degree of angular pipe movement can be accommodated.

While specific embodiments of this invention have been illustrated in the accompanying drawings and described hereinabove, it will be apparent to those skilled in the art that changes and modifications may be made therein without departing from the essence of this invention, as set forth in the appended claims.

What I claim is:

1. A pipe joint between a first pipe end and a second pipe end, the pipe joint comprising:

telescoping means allowing the pipe ends to move axially with respect to each other while maintaining fluid-tight communication between them, the telescoping means including generally cylindrical means which at either end is in fluid-tight, articulable connection with a respective pipe end through spherical bearing means, a plurality of contraction units located exteriorly of the pipe ends and telescoping means, each contraction unit including a contraction cylinder and a piston in said cylinder, the contraction cylinder being connected to the first pipe end and the piston being connected to the second pipe end, the cylinder defining a closed volume on the side of the piston which is closest to said second pipe end, fluid conduit means from the interior of one of the pipe ends to the said closed volume, whereby the pressure in said closed volume is a function of the pressure inside said one of the pipe ends, the cylindrical means being a hollow main cylinder, the spherical bearing means including a ring member snugly but slidably surrounding its respective end of the main cylinder and mounted thereon in a liquid-tight manner, the ring member having male spherical surface means with its centre of curvature located on the axis of the main cylinder, and mating with female spherical seat means on the respective pipe end, the fluid within the pipe ends having direct access to part of the ring member adjacent its respective pipe end and thus exerting a first axial force on the ring member in the direction away from the respective pipe end, and further fluid conduit means from the interior of one of the pipe ends to a part of the ring member remote from its respective pipe end and thus exerting a second axial force on the ring member in the direction toward the respective pipe end, the axial projections of the areas of said parts of the ring member being such as to make said first and second axial forces substantially identical, whereby the ring member is in hydraulic balance.

2. The invention claimed in claim 1, in which the male spherical surface means of each ring member includes a first male spherical surface having a first diameter, a second male spherical surface having a second diameter greater than said first diameter, and a third male spherical surface having a third diameter smaller than said second diameter, a first step between said first and second surfaces and a second step between said second and third surfaces, a first annular chamber adjacent said first step and vented to the atmosphere, and a second annular chamber adjacent said second step and in communication with said further fluid conduit means, all spherical surfaces being concentric.

3. The invention claimed in claim 2, in which said first and third surfaces have the same diameters.

4. The invention claimed in claim 1, in which said further fluid conduit means is branched from said first-mentioned fluid conduit means, whereby the fluid pressure on said remote part of the ring member is the same as that in said closed volume.

5. In a pipe joint between a first pipe end and a second pipe end, the pipe joint including telescoping means allowing the pipe ends to move axially, rotatably and genicularly with respect to each other, the pipe joint including a plurality of contraction units located radially outwardly of the pipe ends, the contraction units being connected between the pipe ends and being supplied with fluid under pressure so that they counteract the axial separation tendency between the pipe ends when the latter are filled with a fluid under pressure, the telescoping means including a hollow cylinder extending between the pipe ends, the improvement which comprises:

a spherical bearing in the form of a ring member snugly but slidably surrounding each end of the hollow cylinder and mounted thereon in a liquid-tight manner, each ring member having male spherical surface means with its centre of curvature located on the axis of the cylinder, and mating with female spherical seat means on the respective pipe end, the fluid within the pipe ends having direct access to part of each ring member adjacent its respective pipe end and thus exerting a first axial force on the ring member in the direction away from the respective pipe end, and further fluid conduit means from the interior of one of the pipe ends to a part of each ring member remote from its respective pipe end and thus exerting a second axial force on the ring member in the direction toward the respective pipe end, the axial projections of the areas of said parts of the ring member being such as to make said first and second axial forces substantially identical, whereby each ring member is in hydraulic balance.

* * * * *